(12) United States Patent
Beuchat et al.

(10) Patent No.: US 10,528,114 B2
(45) Date of Patent: Jan. 7, 2020

(54) GRAPHICS PROCESSOR POWER MANAGEMENT

(71) Applicant: Intel Corporation, Santa Clara, CA (US)

(72) Inventors: Marc Beuchat, Yakum (IL); Jason Tanner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 731 days.

(21) Appl. No.: 15/148,115

(22) Filed: May 6, 2016

(65) Prior Publication Data

US 2017/0322612 A1 Nov. 9, 2017

(51) Int. Cl.
*G06F 1/32* (2019.01)
*G06T 1/20* (2006.01)
*G06F 1/324* (2019.01)
*G06F 1/3228* (2019.01)

(52) U.S. Cl.
CPC ............ *G06F 1/324* (2013.01); *G06F 1/3228* (2013.01); *G06T 1/20* (2013.01)

(58) Field of Classification Search
CPC .......... G06F 1/324; G06F 1/3228; G06T 1/20
See application file for complete search history.

(56) References Cited

U.S. PATENT DOCUMENTS

| | | | | |
|---|---|---|---|---|
| 6,081,299 A | * | 6/2000 | Kesselring | H04N 21/23608 348/425.2 |
| 2015/0131748 A1 | * | 5/2015 | Ono | H04N 19/172 375/240.29 |
| 2015/0350656 A1 | * | 12/2015 | Chung | H04N 19/152 375/240.02 |
| 2016/0134865 A1 | * | 5/2016 | Amer | H04N 19/176 375/240.02 |

* cited by examiner

*Primary Examiner* — Stefan Stoynov
(74) *Attorney, Agent, or Firm* — Grossman, Tucker, Perreault & Pfleger, PLLC

(57) ABSTRACT

One embodiment provides an apparatus. The apparatus includes a graphics processor and power management logic. The graphics processor includes display engine logic and encoder logic. The power management logic is to adjust an operating frequency of the encoder logic based, at least in part, on an encode time duration and based, at least in part, on a frame period.

24 Claims, 6 Drawing Sheets

//]: #

GRAPHICS PROCESSOR POWER MANAGEMENT

FIELD

The present disclosure relates to power management, in particular to, power management for a graphics processor.

BACKGROUND

Computing devices, such as smart phones, tablets, etc., may be coupled wirelessly to an external display. Image data may be converted to display data by, for example, a graphics processor. Display data may be encoded for wireless transmission from the computing device to the wireless display. Converting and/or encoding the display data for transmission consumes energy and thus battery capacity.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to power management for a graphics processor. Power management logic is described herein as an apparatus, method and/or system to control an operating frequency, an operating voltage and/or start/stop time, and thus power draw, of encoder logic based, at least in part, on at least one of a plurality of power management control parameters. In one embodiment, the power management logic is configured to adjust the encoder operating frequency and/or operating voltage based on an encode time in a given frame period (as may be determined by a synchronizing signal, e.g., Vsynch). In another embodiment, the power management logic is configured to adjust the encoder operating frequency and/or operating voltage based on the amount of data (e.g., percentage) that has changed from a current frame and a previous frame and/or the change locations within a frame. In another embodiment, power management logic is configured to delay a start time of encoding operations based, at least in part, on a stall duration and/or based, at least in part, on an amount and/or location of changed display data. The encoder may be in a powered down state during the delay time.

Figure 1:
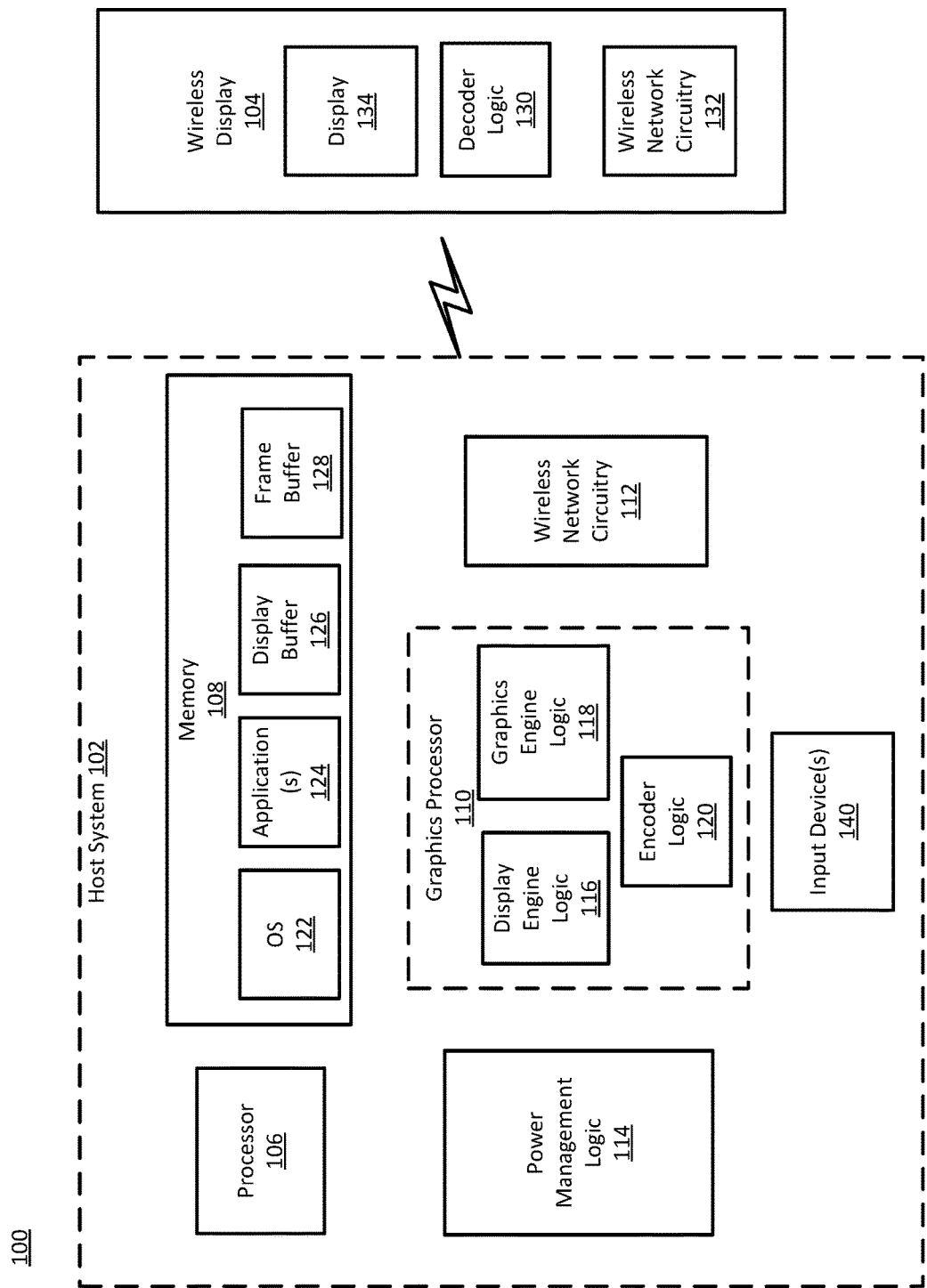
FIG. 1 illustrates a functional block diagram of system including a graphics processor power management system consistent with several embodiments of the present disclosure.

FIG. 1 illustrates a functional block diagram of a system 100 including a graphics processor power management system consistent with several embodiments of the present disclosure. System 100 includes a host system 102 and a wireless display 104. While the foregoing power management techniques are disclosed herein with reference to wireless graphics systems, it will be understood that the power management techniques disclosed herein may apply to any graphics system, wired or wireless. The host system 102 is generally configured to wirelessly transmit encoded video frames which are decoded and displayed on the wireless display 104. The host system 102 includes a system processor 104, system memory 108, power management logic 114, graphics processor circuitry 110, wireless network interface circuitry 112, and may also include at least one input device 140 (e.g., mouse input device, keyboard input device, touch sensitive display input device, etc.). The host system 102 may be embodied as a variety of computer system platforms including, for example, stand-alone personal computer, mobile computing devices (e.g., iPad®, iPhone®, Galaxy®, Windows® Tablet, etc.) and/or other computing system.

Wireless display 104 generally includes decoder logic 130 configured to decode encoded video data received from the host system 102. The decoder logic 130 may comply or be compatible with one or more media codec standards and/or specifications including, but not limited to, AVC (Advanced Video Coding), e.g., H.264/MPEG-4, Part 10; VP9 (Google® open video coding format) or HEVC (High Efficiency Video Coding), e.g., H.265, video compression standard, as described herein.

Wireless display 104 may also include wireless network circuitry 132 configured to receive wireless data from host system 102. The wireless display 104 also includes a display 134 to display video data from the host system 102 and/or other video data. The display 134 may include, for example, an LED (light emitting diode)/LCD (liquid crystal display) flat-panel type display, CRT (cathode ray tube) display, and/or other known and/or after-developed display technologies, etc.

The graphics processor circuitry 110 generally includes display engine logic 116, graphics engine logic 118 and encoder logic 120, as will be described in greater detail below. Graphics processor circuitry 110 may be configured to manage and/or enhance performance of video and graphics as compared to a general-purpose processor. For example, graphics processor circuitry 110 may be configured to render two-dimensional or three-dimensional graphics, to implement texture mapping, to render polygons, to support a range of colors, etc. Graphics processor circuitry 110 may generally be configured to perform operations on a plurality of data values (e.g., pixels) in parallel (i.e., single instruction multiple data (SIMD)). For example, graphics processor circuitry 110 may encode or decode video streams, pre or post process video frames using techniques such as denoise, contrast enhancement, image stabilization, etc. Graphics processor circuitry 110 may include graphics processors manufactured by, for example, Intel®, Qualcomm®, AMD (Advanced Micro Devices), nVidia®, etc.

System memory 108 is configured to host at least one operating system 122 and at least one application 124. In the context of this disclosure, and as will be described in greater detail below, the OS 122 and/or application 124 may each be configured to generate certain types of graphics commands, such as, for example, display scan-out commands, merging of application layers commands, input device commands, protected content commands, etc. Wireless network circuitry 112 and wireless network circuitry 132 are configured to communicate with each other using a wireless communication protocol. The wireless communication protocol may include, for example, WiFi, IEEE 802.11ad, WirelessHD™, etc.

OS 122, applications 124 and/or graphics engine logic 118 may be configured to receive and/or generate display information. The display information may then be converted to rasterized image data for storage in display buffer 126. OS 122, including one or more graphics-related application programming interfaces (APIs), and/or graphics engine logic 118 may be configured to convert display information into rasterized image data. Display information may include, but is not limited to, protected content (e.g., video read from a DVD (digital versatile (or video) disk)), user inputs via input device(s) (e.g., mouse movement, key presses on a keyboard, touches on a touchpad or touch sensitive display, gestures, etc.), text, icons, cursors, images of buttons, geometric shapes, two-dimensional (2-D) images, three-dimensional (3-D) images, other graphics, etc. The display information may be received and/or generated synchronously or asynchronously. For example, video content may be read from a DVD synchronously at a source rate of 30 frames per second (FPS). In another example, user inputs may be received asynchronously from user input devices. Rasterized image data may then correspond to digital representations of the display information.

The display buffer 126 may be configured to store rasterized image data corresponding to a plurality of application frames. For example, rasterized image data corresponding to one application frame may be available for consumption by display engine logic 116, as described herein, while rasterized image data corresponding to another application frame, in a sequence of application frames, is being generated. Such parallel processing may be configured to reduce latencies associated with generating and displaying frame data corresponding to the display information. In another example, respective rasterized image data sets for each application of a plurality of applications may be stored in display buffer 126. The respective rasterized image data sets may be merged into frame lines and stored in frame buffer 128 by display engine logic 116, as described herein.

Typically, the graphics engine logic 118 receives a graphics command, for example, from the OS 122 and/or application 124 to generate rasterized image data. The graphics engine logic 118 may be further configured to store the rasterized image data in the display buffer 126. A flip operation is configured to indicate that new content, i.e., new display information, is available (i.e., rasterized data ready). For example, a pair of "ping pong" buffers may be used. In other words, while rasterized image data contained in a first buffer is being consumed, if new content is placed in a second buffer, a "flip" instruction may be issued. The flip instruction is configured to indicate that a pointer should "flip" to the buffer with the newest content. VSynch, a synchronizing signal, is related to displaying the image data and may thus occur at regular intervals, e.g., 60 Hz (hertz). For example, a source frame rate for a DVD is 30 frames per second, thus, flips may occur at 30 Hz, in other words, flips may occur every other Vsynch. If there is no flip (i.e., no updated frame prior to a Vsynch), there is no new display information for the display engine logic 116 to process. Thus, the encoder logic 120 may reencode the prior frame or, if the prior frame was already good quality, the encoder logic 120 may provide a skip frame indicator configured to cause display 134 to redisplay the prior frame. Thus, no flips, one flip or a plurality of flips may occur between adjacent VSynch pulses.

Rasterized image data may be per application for a plurality of applications. For example, a decoder, e.g., decoder logic 130, may be configured to decode a frame buffer. In another example, a frame buffer that contains DVD video information may be combined with a desktop background. In some embodiments, there may be a plurality of surfaces that have been pre-rendered and stored off-line that may be retrieved. Each application rasterized image data may then correspond to, for example, a display window.

The display engine logic 116 is configured to generate frame lines based, at least in part, on rasterized image data. For example, a frame line may correspond to a row of rasterized image data. Frame lines may then contain a composite of rasterized image data. For example, composite rasterized image data may contain one or more display windows and a background. The display windows may be layered on the background. Each display window may be related to an application (e.g., a word processor, a spreadsheet application, a web browser, etc.) and one application (e.g., the word processor) may be related to a plurality of windows (e.g., a plurality of documents).

The frame lines may be included in a frame buffer. Thus, the frame buffer may include a series of pixel data for display. Pixel data may include, for example, a binary representation of a color associated with each pixel and an array of pixel data may then correspond to the composite of the rasterized image data. An amount of pixel data and, thus a size of the array may be related to a resolution of the target display.

The frame lines may be stored as data blocks in the frame buffer 128. The display engine logic 116 may also generate a tail pointer and as each block of frame line data is generated, the tail pointer may be updated, as each block is generated, to point to the last complete frame line block of data in the frame buffer 128.

The encoder logic 120 is configured to encode the data blocks stored in the frame buffer 128. A size of the data block encoded by the encoder logic 120 is related to the media codec. For example, AVC may be configured to encode 16×16 based blocks. In another example, HEVC may be configured to encode 64×64 or 32×32 blocks. Each block may be subdivided into smaller blocks. The blocks may be encoded as inter (temporally) with motion vectors or intra (spatially) coded based on the neighbor pixels. AVC may include rows of macroblocks and HEVC may include rows of coding units.

The encoder logic 120 is also configured to generate a head pointer and update the head pointer for each block of frame data encoded. The head pointer points to specific memory locations in the frame buffer 128 as data is encoded. In an embodiment, the encoder logic 120 may be configured to encode an entire frame after the display engine logic 116 has completed (i.e., composited) the frame. In this embodiment, encoding may be initiated in response to a command. In another embodiment, the encoder logic 120 may be configured to encode a portion of a frame in parallel with the display engine logic 116 compositing another portion of the same frame. In this embodiment, encoding may be initiated in response to, e.g., an interrupt.

The encoder logic 120, generally, takes longer to encode the frame data blocks than the display engine logic 116 takes to generate the frame data blocks, and therefore the head pointer typically lags behind the tail pointer. When the encoder logic 120 and the display engine logic 116 are working on the same frame, e.g., frame n, the display engine logic 116 may write any line and the encoder logic 120 may read up to the tail pointer. If the encoder logic reaches the tail pointer, then the encoder logic 120 may stall until the tail pointer moves (i.e., the display engine logic 116 has processed more data). If the encoder logic 120 is working on the current frame, e.g., frame n, and the display engine logic 116 is working on the next frame, e.g., frame n+1, the display engine logic 116 may only write until it reaches the head pointer (i.e., the frame line that the encoder logic 120 has completed writing (i.e., encoding). When the display engine logic 116 and/or encoder logic 120 complete a frame, each may set its respective tail/head pointer to a maximum value, e.g., 0xFF.

The encoded frame lines are forwarded, for example, as a bit stream of data, to the wireless network circuitry 112. The wireless network circuitry 112 modulates a carrier with the encoded frame lines and transmits the modulated encoded frame lines to wireless network circuitry 132 of the wireless display 104. Wireless network circuitry 132 is configured to receive the modulated encoded frame lines and to demodulate the received modulated encoded frame lines to retrieve the encoded frame lines. Decoder logic 130 of the wireless display 104 decodes the encoded frame lines and provides the frame lines to display 134. The wireless display 104 generally operates at a fixed vertical scan frequency, hereinafter Vsynch, of a synchronization signal during which period a complete frame may be displayed. Typical Vsynch frequencies include, for example, 60 Hz, 72 Hz, etc. The wireless display 104 may be configured to support a plurality of Vsynch values, and a given value may be set by the host system 102 in communication with the wireless display 104 and/or set by the wireless display 104. The source frame rate may be synchronous (greater than, less than, or equal to the Vsynch frequency) or may be asynchronous, depending on the application type. Application types include, but are not limited to, DVD playback, user interaction (e.g., word processor, spreadsheet, web browser, etc.), gaming, etc.

The display engine logic 116 generally operates at a fixed frequency that corresponds to Vsynch, the synchronization signal. In other words, Vsynch triggers the display engine logic 116 to scanout a frame. The operating frequency, fe, of the encoder logic 120 is related to the operating voltage, Ve, of the encoder logic 120. The operating frequency may be further related to a display resolution such that the operating frequency for a relatively higher resolution display is greater than the operating frequency for a relatively lower resolution display. The operating frequency, fe, of the encoder logic 120 is generally related to the overall power consumption of the encoder logic 120. Thus, as fe increases, the encoder logic 120 is typically able to process and encode frame lines at a faster rate but at an increased power draw, and as fe decreases the encoder logic 120 is typically able to process and encode frame lines at a decreased power draw but at a slower rate.

For a selected operating voltage, Ve, the encoder logic 120 may have a range of operating frequencies bounded by a maximum operating frequency, femax, and a minimum operating frequency, femin. The maximum operating frequency and the minimum operating frequency are related to the operating voltage, Ve, such that if Ve decreases then both femax and femin decrease and if Ve increases, both femax and femin increase. Thus, adjusting the operating voltage, Ve, adjusts femax and femin. For a selected operating voltage, Ve, the operating frequency, fe, may be adjusted between femax and femin.

Generally, an optimum performance for power corresponds to the highest frequency at the lowest possible operating voltage. For example, a selected encoder logic may have an operating frequency range of 200 MHz to 500 MHz for an operating voltage of 2 Volts and an operating frequency range of 500 MHz to 1 GHz for an operating voltage of 4 Volts. Thus, in this example, an optimum power performance may be achieved for an operating frequency of 500 MHz at an operating voltage of 2 V.

Accordingly, in several embodiments described herein, the power management logic 114 is configured to dynamically control an operating frequency, fe, and/or an operating voltage, Ve, of the encoder logic 120 to enable the encoder logic 120 to process and encode frame lines in a manner that reduces the overall power draw of the encoder logic 120 with few, if any, frame drops, as will be in more detail described below.

Figure 2:
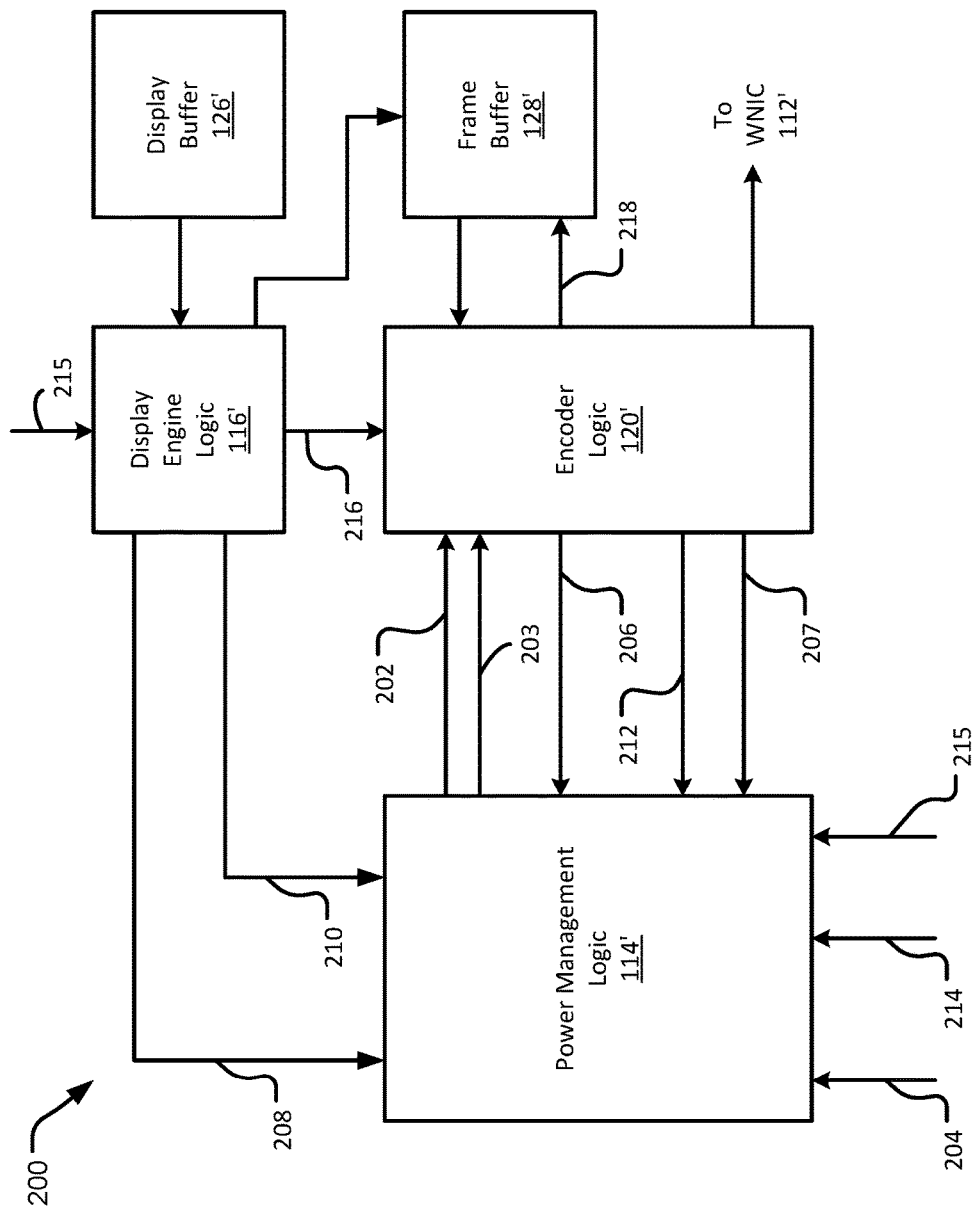
FIG. 2 illustrates a functional block diagram of one example graphics processor power management system consistent with several embodiments of the present disclosure.

FIG. 2 illustrates a functional block diagram of one example graphics processor power management system 102' according to one embodiment of the present disclosure. In FIG. 2, certain elements of the system 102 of FIG. 1 have been omitted for clarity, but it is to be understood that the omitted elements from FIG. 1 may be included in the embodiment of FIG. 2 and/or other elements as may be presented in a given system. In this embodiment, the power management logic 114', display engine logic 116' and encoder logic 120' are illustrated in greater detail. Encoder logic 120' output may then be provided to wireless network circuitry (WNIC) 112'.

With continued reference to FIG. 1, the power management logic 114' of FIG. 2 is configured to receive a plurality of power management control parameters and to generate a control signal 202 to control an operating frequency, fe, and/or an operating voltage, Ve of the encoder logic 120' based, at least in part, on at least one power management control parameter. In some embodiments, the power management logic 114' is configured to generate a control signal to control an encoder delay time, i.e., the delay between Vsynch and an encoder start time. Example power management control parameters include, for example, the Vsynch control signal 204, an encode time duration control signal 206, current encoder operating frequency control signal 207, a percent of frame change control signal 208, a frame data change location control signal 210, a stall flag control signal 212, one or more OS/Application trigger control signals 214, and a rasterized image data ready control signal 215.

The Vsynch control signal 204 may include the Vsynch signal described above and/or a signal representative of, or proportional to, a current Vsynch frequency being used by the wireless display 104. The encode time duration control signal 206 may include a signal representative of, or proportional to, the time it has taken the encoder logic 114' to encode the last frame or an average of the respective times it has taken the encoder logic 114' to encode each of m prior frames. In these examples, the encode time duration control signal 206 may represent an actual time (e.g., in milliseconds) or a relative time duration relative to another reference signal, e.g., relative to Vsynch. The current encoder operating frequency control signal 207 may include a signal representative of, or proportional to, the current encoder operating frequency, fe.

The display engine logic 116' may be configured to compare a current frame (e.g., frame n) to one or more prior frames (e.g., frame n−1) to determine the amount of any changes in graphics data between frames. Accordingly, the display engine logic 116' may be configured to generate the percent of frame change control signal 208 representative of, or proportional to, a percentage of the current frame that has changed from one or more prior frames. In addition, in some embodiments, the display engine logic 116' may be configured to compare a current frame (e.g., frame n) to one or more prior frames (e.g., frame n−1) to determine the location of any changes in graphics data between frames, for example, block location of changes to flag "dirty" blocks of changed data. Accordingly, the display engine logic 116' may be configured to generate the frame data change location control signal 208 representative of one or more locations of the current frame that has changed from one or more prior frames. The locations of changed data may be represented by, for example, address locations in the display buffer 126, etc.

As described above, the display engine logic 116' may be configured to generate a tail pointer 216 to point to each complete frame line that is consumed from the display buffer 126' and stored in the frame buffer 128'. The encoder logic 120' may be configured to generate a head pointer 218 to point to the last encoded frame block of the frame buffer 128'. If the head pointer 218 location matches the tail pointer 216 location, meaning that the encoder logic 120' has encoded data in the frame buffer 128' faster than the display engine logic 120' can generate the frame data, the encoder logic 120' may have a stall period while the encoder logic 120' awaits more data from the display engine logic 116' to generate more frame data. These stall periods may be indicative of, for example, no data changes between portions of the prior frame(s) and the current frame and/or the operating frequency, fe, and/or operating voltage, Ve, of the encoder logic 120' may set too high and may therefore be decreased. Accordingly, the encoder logic 120' may also be configured to generate a stall flag control signal 212 indicative of a stall event associated with the encoder logic 120'. The stall flag control signal 212 may represent a block and/or frame location where a stall occurs.

One or more applications 124 and/or the operating system 122 may generate graphics triggers. For example, an application 124 may generate a trigger indicative of a new application surface layer, as may occur, for example, when an application launches or content within an application changes. Also, the operating system 122 may generate graphics triggers indicative of an input device change, for example, a keyboard stroke, mouse movement, a touchscreen gesture, etc. A mouse movement, for example, may cause the display engine logic 116' to overlay mouse pointer information (e.g., cursor location) on current and/or subsequent frames. Accordingly, the operating system 122 and/or application 124 may generate one or more OS/Application trigger control signals 214 indicative of a graphics event occurring in one or more applications and/or OS.

One or more applications 124, operating system 122 and/or graphics engine logic 118 may generate a rasterized image data ready control signal 215. For example, rasterized image data ready (i.e., "flip complete") may be configured to indicate that a rasterized image data frame is ready for consumption by display engine logic 116'. A frequency of the rasterized image data ready control signal may be related and/or may correspond to the source frame rate. The source frame rate may be compared to the frequency of Vsynch to determine whether the source frame rate is less than the frequency of Vsynch or greater than or equal to the frequency of Vsynch. If the source frame rate is less than the frequency of Vsynch then fe may be reduced to less than Vsynch without dropping a frame, as will be described below.

Thus, one or more of these control signals may be used by the power management logic 114' to make power management determinations, as will be described by way of examples below.

End of Frame Power Management

Figure 3:
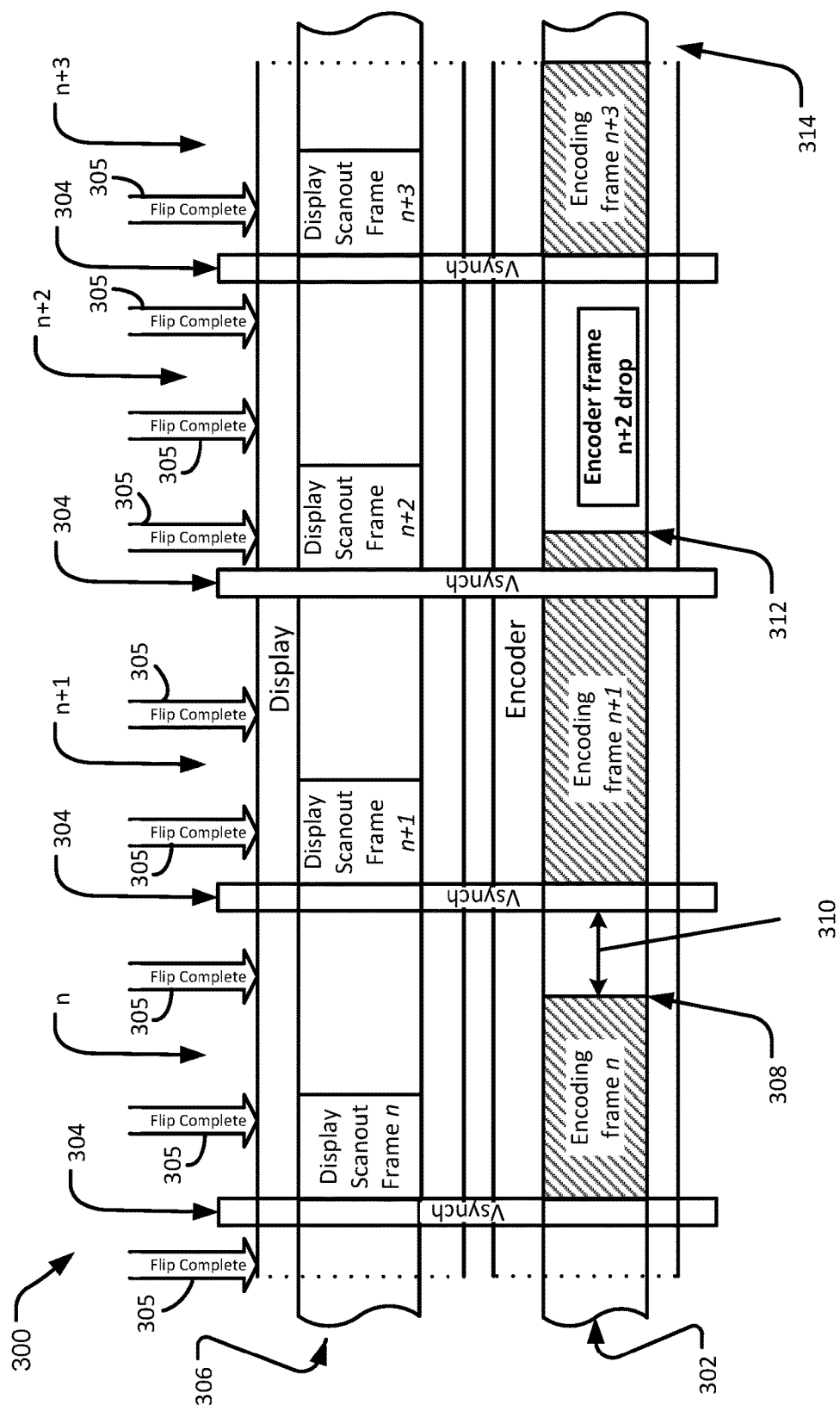
FIG. 3 is a power management timing diagram illustrating encoder operating frequency adjustment according to various embodiments of the present disclosure.

FIG. 3 is a power management timing diagram 300 illustrating encoder operating frequency adjustment according to one embodiment of the present disclosure. With continued reference to FIGS. 1 and 2, the timing diagram 300 depicts the periodic Vsynch signal 304, a plurality of rasterized image data ready signals ("flip complete") 305, encoding time 302 of the encoder logic 120 for frames n, n+1, n+2 and n+3, and a display scanout rate 306 of the display engine logic 116 for frame n, n+1, n+2 and n+3. Vsynch 304 of FIG. 3 corresponds to Vsynch 204 of FIG. 2. The time duration of each frame n, n+1, n+2 and n+3, i.e., the time duration between adjacent Vsynch pulses 304 corresponds to a frame period. The "scanout rate", as used herein, means the time that the display engine logic 120 takes to consume the display buffer 126 to generate frame lines and store the frame lines in the frame buffer 128. In this example, the frequency of the rasterized image data ready signal 305 is greater than the frequency of Vsynch and may vary.

In this example, the power management logic 114 is configured to control the operating frequency, fe, and/or the operating voltage, Ve of the encoder logic 120 to reduce or increase power based on how much time the encoding operation takes during a Vsynch period. In frame n, the encoding operation takes less time than the next Vsynch 304. In other words, the end of the encoding operation 308 for frame n occurs before the next Vsynch 304 occurs. The time period between the end of the encoding operation 308 and the next Vsynch signal is depicted as time period 310. At the end of the encoding operation 308, the encoder logic 120 generates the encode time duration control signal 206. The encoder logic 120 may generate the current operating frequency control signal 207.

The power management logic 114 is configured to compare the encoding time duration to the Vsynch period in frame n to determine the time period 310. If the time period 310 is greater than a threshold, the power management logic 114 may generate control signal 202 to reduce fe (the encoder operating frequency) for the next frame (frame n+1), to save power. The threshold in this example may include, for example, a percentage of the total Vsynch period, for example 5%. Thus, for example, in frame n, if the encoding time 308 takes less than 95% of a Vsynch period, the power management logic 114 may control the encoder logic 120 (via control signal 202) to reduce fe in the next frame. Of course, a threshold of 5% is only an example, and other thresholds may be used and may be based on, for example historical performance, operating bandwidth, graphics performance requirements, reduction of dropped frames, etc. The power management logic 114 may reduce fe and/or Ve if a reduction is available, for example, if fe and/or Ve is not already in a lowest possible operating mode. In other words, fe and/or Ve may not be reduced below a minimum.

The power management logic 114 is also configured to determine an amount that fe and/or Ve can be reduced based on, for example, current fe for frame n, current encoding time for frame n as compared to the Vsynch period, and/or other content-based parameters such as percent change in data between frame n and frame n+1, as will be described in greater detail below. In some embodiments, the power management logic 114 may be configured to reduce fe by a set amount, for example 5%, and the result of the reduction is compared in the next frame. If further reductions are possible, the power management logic 114 may repeatedly reduce fe in subsequent frames. Of course, a 5% reduction in fe is only an example, and in other embodiments, the reduction in fe and/or Ve may be greater or lesser, and may also be dynamically adjusted frame-by-frame, depending on, for example, overall power management strategies and/or requirements, current content changes, dropped frames, etc.

In the example of FIG. 3, fe is reduced at the end of frame n, and the reduced fe is used by the encoder logic 114 to encode the next frame n+1. In this example, however, the reduction in fe in frame n+1 causes the encoding period to be greater than the Vsynch period, which means that the encoding time for frame n+1 "spills over" into the subsequent frame n+2. This may cause, for example, frame n+2 to be dropped. Accordingly, the encoder logic 120 may generate the encode time signal 206 that indicates the operating frequency for frame n+1 is set too low, resulting in a dropped frame. The power management logic 114 may increase fe and/or Ve for the next frame (frame n+3) to reduce or eliminate dropped frames.

Encoding Skipping Power Management

In at least one embodiment, the power management logic 114 is also configured to control the encoding logic 120 to skip encoding operations for one or more frames. In one example, an application (e.g., DVD application to run a DVD movie) may include graphics data that plays at a fixed frames-per-second (FPS) rate, for example, a DVD movie to play at 30 FPS. If the FPS rate (i.e., the source frame rate) is less than ½ of the Vsynch rate, each data frame is repeated in two or more subsequent display frames. Accordingly, using an example of content running at 30 FPS and a Vsynch period corresponding to 60 FPS, the power management logic 114 may control the encoder logic 120 to turn off and/or enter a low power state for every other frame. For example, if frame n is a new frame, the power management logic 114 may control the fe and/or Ve of the encoder logic 120 so that frame n is encoded in one Vsynch period. The content of frame n may be stored in memory and repeated in frame n+1, and for frame n+1, the power management logic 114 may control the encoder logic 120 to skip the encoding operation, thereby reducing power.

Turning again to FIG. 3, for example, if the source frame rate is less than or equal to one half of the Vsynch rate, then encoding frame n+1 may extend into encoder frame n+2 without incurring a frame drop. In other words, if a flip complete occurs in no more than every other Vsynch period (i.e., display frame), then fe may be reduced to less than the Vsynch rate, allowing the encoding frame to extend from a current Vsynch interval (e.g., frame n+1) into a subsequent Vsynch interval (e.g., frame n+2). Thus, when the source frame rate is less than or equal to one half the Vsynch rate, the operating frequency, fe, and/or the operating voltage, Ve, may be reduced allowing the encoding frame to extend into a subsequent frame without incurring a frame drop and/or the encoder logic may be powered down for the subsequent frame.

Encoder Stall Power Management (Selective Encode)

Figure 4:
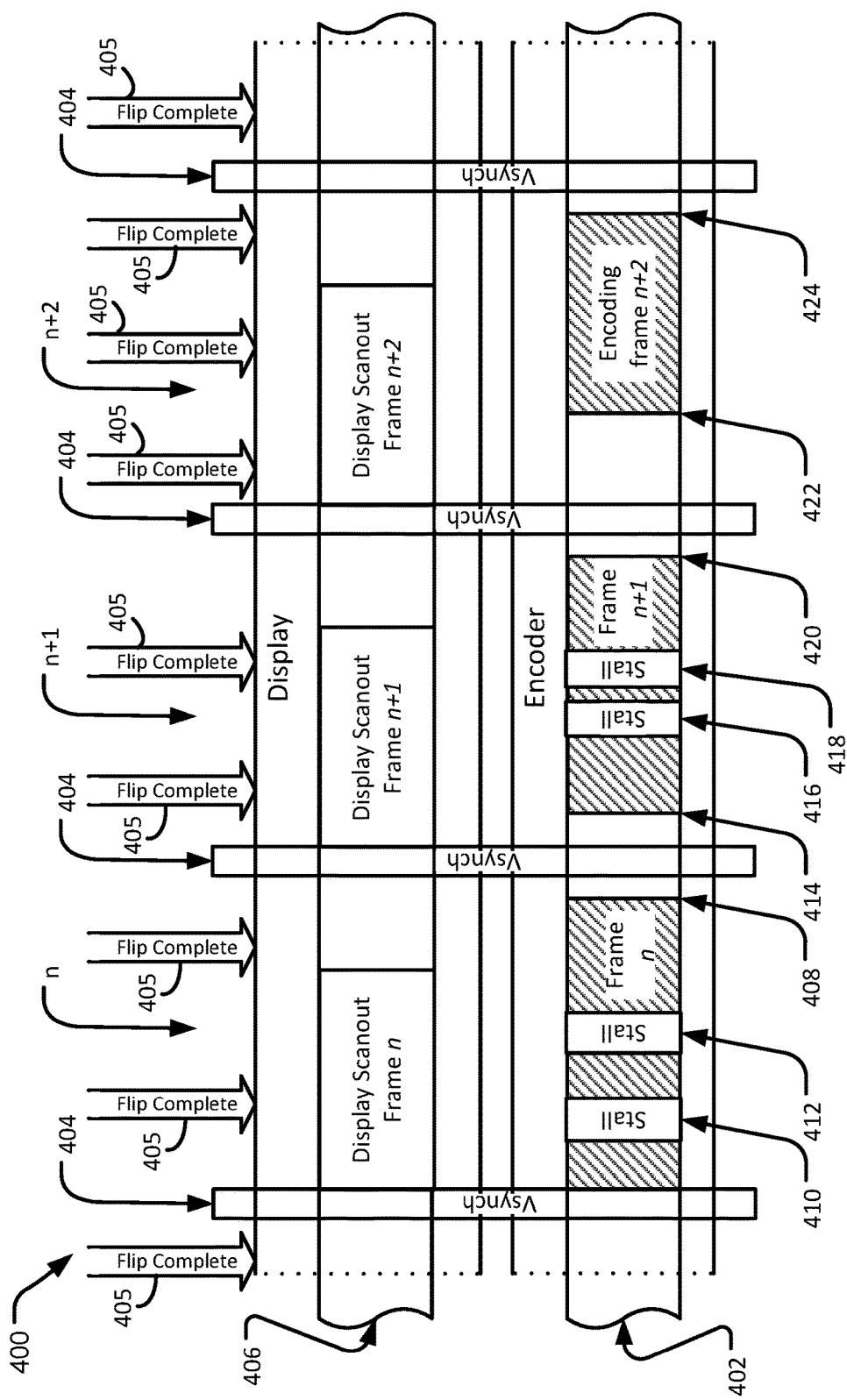
FIG. 4 is a power management timing diagram illustrating start encoding delay adjustment according to various embodiments of the present disclosure.

FIG. 4 is a power management timing diagram 400 illustrating start encoding delay adjustment according to various embodiments of the present disclosure. With continued reference to FIGS. 1 and 2, the timing diagram 400 depicts the periodic Vsynch signal 404, a plurality of rasterized image data ready signals ("flip complete") 405, encoding time 402 of the encoder logic 120 for frames n, n+1, n+2 and n+3, and a display scanout rate 406 of the display engine logic 116 for frame n, n+1, n+2 and n+3. The time duration of each frame n, n+1, n+2 and n+3, i.e., the time duration between adjacent Vsynch pulses 404 corresponds to a frame period. Vsynch 404 of FIG. 4 corresponds to Vsynch 204 of FIG. 2.

In this example, the power management logic 114 is configured to control the encoder delay time and/or the operating frequency, fe, and/or the operating voltage, Ve, of the encoder logic 120 to reduce and/or eliminate encoder stall. The encoder delay time is the time between the start of the display scanout of the current frame and the start of encoding of the current frame. In other words, the encoder delay time is the time duration between Vsynch and the start of encoding for a frame, e.g., frame n. In a stall condition, the encoder logic 120 is powered up but waiting. In other words, the encoder logic 120 is powered up and consuming power while not encoding.

The power management logic 114 is configured to control the encoder logic 120 based, at least in part, on a stall flag. The stall flag is configured to indicate that a stall has occurred in the current and/or prior frame. The stall flag may be provided to power management logic 114 by encoder logic 120. The stall flag may be set and the decoder logic 120 may stop encoding if the head pointer increases to greater than or equal to the tail pointer of display engine logic 116. A stall condition may indicate that the operating frequency, fe, and/or the operating voltage, Ve, of the encoder logic 120 may be reduced and/or that the encoder logic 120 may be powered down for the encoder delay time, thus decreasing encoder logic 120 power consumption.

For example, in frame n, encoding starts when scan out starts at Vsynch. Two stall periods 410, 412 occur and encoding ends at time 408 for frame n. Power management logic 114 is configured to provide an encode delay time control signal to encoder logic 120 so that encoding start is delayed to time 414 in frame n+1. Two stalls 416, 418 occur in frame n+1 but are of lesser duration compared to stalls 410 and 412. The encoding operation ends at time 420 for frame n+1. The encoding delay time is further increased in frame n+2 so that encoding starts at time 422 after Vsynch. Encoding ends at time 424 in frame n+2. Thus, the encoder logic 120 has not stalled in frame n+2. Power consumption may be reduced by powering down encoder logic 120 during the encoding delay time, i.e., time period between Vsynch and start time 414 for frame n+1 and/or time period between Vsynch and the start time 422 for frame n+2.

The encode delay time may be increased incrementally over a number of frames until the stalls are eliminated. The increment may be related to a stall duration and/or contents of the frame. For example, the increment may be equal to the stall duration. In another example, the increment may correspond to a fraction of the stall duration, e.g., 50%. Of course, an increase in encode delay time of 50% of stall duration is only an example, and in other embodiments, the increase may be greater or lesser, and may also be dynamically adjusted frame by frame, depending on, for example, overall power management strategies and/or requirements, current content changes, dropped frames, etc.

In another example, the increment may be estimated based, at least in part, on an amount of change (e.g., percent change) in frame data between a prior frame in a current frame and/or a location of the changes within the frame. OS 122 and/or display engine logic 116 may be configured to indicate regions of a frame that have changed. For example, only a portion of a scene included in a frame may change and the bulk of the frame data may not change. Thus, the increment may be estimated based, at least in part, on the percent change. In another example, moving the mouse may cause only a location of a cursor within a frame to change and the bulk of the frame data may not change. Thus, the increment may be estimated based, at least in part, on the initial location of the mouse and based, at least in part, on the current location of the mouse. Thus, rather than stalling the encoder logic (i.e., encoder powered up but waiting, not actively encoding), the power management logic may be configured to power down the encoder logic during the encoder delay time, thus reducing power consumption.

Thus, power management logic 114 may be configured to control the operating frequency, operating voltage and/or start/stop time, and thus power draw, of encoder logic 120. Power management logic 114 may receive one or more control signals from display engine logic 116, encoder logic 120, OS 122, applications 124 and/or graphics engine logic 118. Power management logic 114 may then control the operating frequency and/or start/stop time based, at least in part, on one or more of the received control signals.

Power management logic 114 is configured to operate to reduce the power draw of encoder logic 120, when possible. Power management logic 114 is further configured to increase the operating frequency and/or operating voltage and/or reduce the start/stop time in response to one or more control signals. For example, an increase in percent of frame change may be indicated by control signal 208 from display engine logic 116. In another example, user input device activity, e.g., mouse movement, may be detected by OS 122 and/or application 124 that may then provide an indication of the mouse movement to the power management logic 114 via OS/application trigger control signal 214. Power management logic 114 may then be configured to decrease and/or eliminate the delay between Vsynch and the encoder start time. Power management logic 114 may be further configured to increase the operating frequency, fe, and/or the operating voltage, Ve, of the encoder logic 120. Thus, the OS/application trigger control signal 214 may be utilized by power management logic 114 to cause encoder logic 122 exit a low-power mode prior to potentially dropping a frame.

Figure 5:
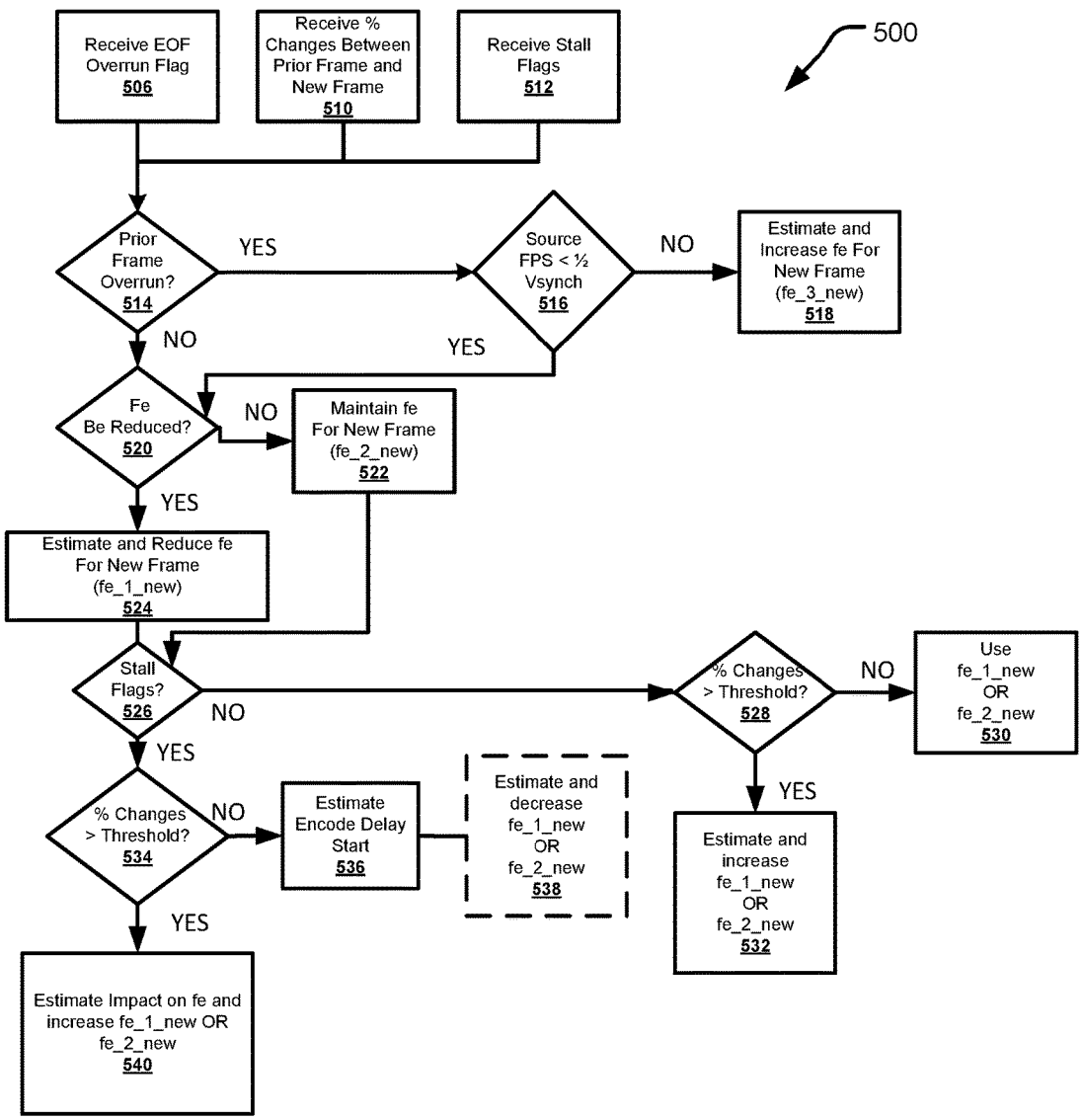
FIG. 5 is a flowchart of graphics processor power management operations consistent with several embodiments of the present disclosure.

FIG. 5 is a flowchart 500 of graphics processor power management operations consistent with several embodiments of the present disclosure. In particular, flowchart 500 illustrates operations that may be performed generally continuously to adjust power consumption of encoder logic. The operations may be performed for example by power management logic 114, 114' of FIGS. 1 and 2. In the description of flowchart 500 below, a current operating frequency corresponds to fe_2_new, a new operating frequency greater than the current operating frequency corresponds to fe_3_new and a new operating frequency less than the current operating frequency corresponds to fe_1_new. "New" as used with respect to operating frequency in flowchart 500 corresponds to encoder logic operating frequency for a next (i.e., "new") encoder frame relative to a current encoder frame.

The operations of flowchart 500 may begin with receiving at least one control input signal. For example, operation 506 includes receiving an end of frame (EOF) overrun flag. In another example, operation 510 includes receiving a percent change between a prior frame and a new frame. In another example, operation 512 includes receiving one or more stall flags. The at least one control input signal may be received, for example, by power management logic 114 from display engine logic 116 and/or encoder logic 120.

Whether a prior frame has overrun may be determined at operation 514. For example, whether the prior frame has overrun may be determined based, at least in part, on receiving the EOF overrun flag of operation 506. If the prior frame has not overrun, then whether the operating frequency may be reduced may be determined at operation 520. If the prior frame has overrun, whether the source frame rate is less than one half Vsynch may be determined at operation 516. If the source frame rate is not less than one half Vsynch, then an increase in the operating frequency, fe, of the encoder logic may be estimated and the operating frequency may be increased to fe_3_new for a new frame at operation 518. If the source frame rate is less than one half Vsynch, then whether the operating frequency may be reduced may be determined at operation 520. In other words, if the source frame rate is less than one half Vsynch, then the operating frequency of the encoder logic may be reduced without dropping a frame, as described herein.

If the operating frequency cannot be reduced, then the operating frequency may be maintained at a current operating frequency, fe_2_new, at operation 522. For example, if the operating frequency is at the minimum operating frequency, then the operating frequency may not be reduced. Program flow may then proceed to operation 526. If the operating frequency can be reduced, then a reduction in operating frequency may be estimated and the operating frequency may be reduced for a new frame to new operating frequency, fe_1_new, at operation 524. Program flow may then proceed to operation 526.

Whether any stall flags are set may be determined at operation 526. If no stall flags are set, whether the percent changes between a current frame and a prior frame are greater than a threshold may be determined at operation 528. If the percent changes are not greater than the threshold, then the new operating frequency may remain at fe_1_new or fe_2_new that was determined at operation 524 or operation 522. If the percent changes are greater than the threshold, then an increase in the new operating frequency determined at operation 524 or operation 522 may be estimated and the corresponding new operating frequency may be increased (i.e., adjusted upward) at operation 532.

If at least one stall flag is set, whether the percent changes between the current frame in the prior frame are greater than a threshold may be determined at operation 534. If the percent changes are not greater than the threshold, then an encode delay start time may be estimated at operation 536. In some embodiments, in addition to a nonzero encode delay start time, a decrease in the new operating frequency (and/or operating voltage) determined at operation 524 or operation 522 may be estimated and the corresponding new operating frequency may be decreased (i.e., adjusted downward) at operation 538. If the percent changes are greater than the threshold, then an impact on the operating frequency may be estimated and the new operating frequency determined at operation 524 or operation 522 may be increased at operation 540.

Thus, the operating frequency, operating voltage and/or start/stop time, and thus power draw, of an encoder may be adjusted based, at least in part, on one or more of a plurality of power management control parameters.

Figure 6:
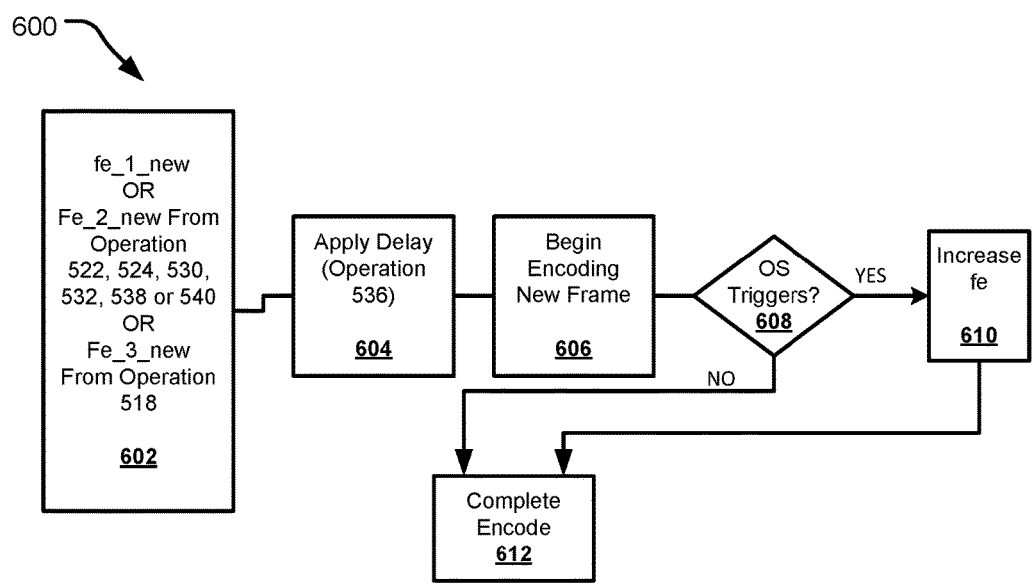
FIG. 6 is a flowchart of operating parameter adjustment operations consistent with several embodiments of the present disclosure.

FIG. 6 is a flowchart 600 of operating parameter adjustment operations consistent with several embodiments of the present disclosure. In particular, flowchart 600 illustrates operations that may be performed generally continuously to adjust power consumption of encoder logic. The operations may be performed for example by power management logic 114, 114' of FIGS. 1 and 2.

The operations of flowchart 600 may begin with the setting the new operating frequency (and/or operating voltage) at operation 602. The new operating frequency may be determined according to flowchart 500. For example, an operating frequency that is unchanged from a prior operating frequency corresponds to fe_2_new, a new operating frequency greater than the prior operating frequency corresponds to fe_3_new and a new operating frequency less than the prior operating frequency corresponds to fe_1_new.

A delay (i.e., encoder logic start time delay) may be applied at operation 604. For example, the delay may be determined at operation 536 of flowchart 500. Operation 606 may include beginning encoding a new frame. Whether there are any OS triggers may be determined at operation 608. If there are OS triggers, then the operating frequency, fe, and/or the operating voltage, Ve, may be increased at operation 610. The encoding may then be completed at operation 612. If there are not OS triggers, program flow may proceed to completing the encode at operation 612.

Thus, a new frame may be encoded by encoder logic. The encoder logic may be configured by power management logic to operate at a new operating frequency and/or a new operating voltage determined according to the operations of flowchart 500. The encoding may be initiated after a delay, if any. The encoder logic may be powered down during the delay. The determined new operating frequency and/or a new operating voltage may be increased in response to detecting an OS trigger, as described herein.

While the flowcharts of FIGS. 5 and 6 illustrates operations according various embodiments, it is to be understood that not all of the operations depicted in FIGS. 5 and 6 are necessary for other embodiments. In addition, it is fully contemplated herein that in other embodiments of the present disclosure, the operations depicted in FIGS. 5 and/or 6 and/or other operations described herein may be combined in a manner not specifically shown in any of the drawings, and such embodiments may include less or more operations than are illustrated in FIGS. 5 and 6. Thus, claims directed to features and/or operations that are not exactly shown in one drawing are deemed within the scope and content of the present disclosure.

Thus, this disclosure generally relates to power management for a graphics processor. Power management logic is described herein as an apparatus, method and/or system to control an operating frequency, operating voltage and/or start/stop time, and thus power draw, of an encoder based, at least in part, on at least one of a plurality of power management control parameters. In one embodiment, the power management logic is configured to adjust the encoder operating frequency based on an encode time in a given frame period (as may be determined by a synchronizing signal, e.g., Vsynch). In another embodiment, the power management logic is configured to adjust the encoder operating frequency and/or operating voltage based on the amount of data (e.g., percentage) that has changed from a current frame and a previous frame and/or the change locations within a frame. In another embodiment, power management logic is configured to delay a start time of encoding operations based, at least in part, on a stall duration and/or based, at least in part, on an amount and/or location of changed display data. The encoder may be in a powered down state during the delay time.

It may be appreciated that the foregoing power management techniques applied to encoder logic 120 may be similarly applied to display engine logic 116. The power management techniques may be applied to display engine logic 116 alternatively to, and/or in addition to, the encoder logic 120, as described herein. Thus, an operating frequency, operating voltage and/or start/stop time of display engine logic may be controlled by power management logic based, at least in part, on one or more power management control parameters.

As used in any embodiment herein, the term "logic" may refer to an application, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. In some embodiments, one or more of the logic elements described herein may be embodied as specific integrated circuit elements, for example ASIC devices, etc., which may include software/firmware to perform some of the operations described herein. In other embodiments, one or more of the logic elements described herein may be implemented using general-purpose processing environments, for example system CPU, etc., which may include software/firmware to perform some of the operations described herein thus transforming a general-purpose processor to a specific-purpose processor.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface.

The decoder logic 130 may comply and/or be compatible with one or more media codec standards and/or specifications. For example, the decoder logic 130 may comply and/or be compatible with an AVC (Advanced Video Coding) standard, e.g., ITU-T H.264 standard and ISO/IEC MPEG-4 AVC standard (formally, ISO/IEC 14496-10—MPEG-4 Part 10, Advanced Video Coding), published May 2003, by the ITU-T (International Telecommunication Union Telecommunication Standardization Sector) Video Coding Experts Group (VCEG) together with the ISO/IEC (International Organization for Standardization/International Electrotechnical Commission) JTC1 Moving Picture Experts Group (MPEG) JVT (Joint Video Team), and/or later and/or related versions of these standards, for example, high Efficiency Video Coding (HEVC), also known as H.265 and MPEG-H Part 2, published June 2013 and/or later and/or later versions of these standards, e.g., standards published July 2015. In another example, the decoder logic 130 may comply and/or be compatible with open source VP9 specification (Google® open video coding format), for example, released June 2013, and/or later and/or related versions of this specification.

Wireless network circuitry 112 and wireless network circuitry 132 are configured to communicate with each other using a communication protocol. The wireless communication protocol may include, for example, WiFi, IEEE 802.11ad, WirelessHD™, etc.

Wireless network circuitry 112 and wireless network circuitry 132 may comply or be compatible with the 802.11 standards published by the Institute of Electrical and Electronics Engineers (IEEE), titled "IEEE 802.11-2007 Standard, IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications" published, Mar. 8, 2007, and/or later and/or related versions of these standard, e.g., 802.11ad-2012—IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band.

Wireless network circuitry 112 and wireless network circuitry 132 may comply or be compatible with a WirelessHD™ Specification, e.g., WirelessHD™ Specification Version 1.1, April 2010, maintained by the WirelessHD™ Consortium, and/or later and/or related versions of this specification.

The operating system (OS) 122 may be configured to manage system resources and control tasks that are run on, e.g., processor 106. For example, the OS may be implemented using Microsoft® Windows®, HP-UX®, Linux®, or UNIX®, although other operating systems may be used. In another example, the OS may be implemented using Android™, iOS, Windows Phone® or BlackBerry®. In some embodiments, the OS may be replaced by a virtual machine monitor (or hypervisor) which may provide a layer of abstraction for underlying hardware to various operating systems (virtual machines) running on one or more processing units.

Memory 108 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

EXAMPLES

Examples of the present disclosure include subject material such as a method, means for performing acts of the method, a device, or of an apparatus or system related to a power management system, as discussed below.

Example 1

According to this example, there is provided an apparatus. The apparatus includes a graphics processor and a power management logic. The graphics processor includes display engine logic and encoder logic. The power management logic is to adjust an operating frequency of the encoder logic based, at least in part, on an encode time duration and based, at least in part, on a frame period.

Example 2

This example includes the elements of example 1, wherein the power management logic is to adjust the operating frequency based, at least in part, on at least one power management control parameter.

Example 3

This example includes the elements of example 2, wherein the power management control parameter is selected from the group including one or more of a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

Example 4

This example includes the elements of example 1, wherein the power management logic is further to adjust at least one of the operating frequency and/or an encoder delay time to reduce and/or eliminate encoder stall.

Example 5

This example includes the elements of example 4, wherein the power management logic is to adjust the encoder delay time based, at least in part, on a location of a change within a frame.

Example 6

This example includes the elements according to any one of examples 1, 2 or 4, wherein the power management logic is to skip encoding operations for one or more frames if a source frame rate is less than one half a vertical scan frequency of a synchronizing signal.

Example 7

This example includes the elements according to any one of examples 1, 2 or 4, wherein the power management logic is to adjust the operating frequency based, at least in part, on a percent change between a prior frame and a new frame, the percent change received from the display engine logic.

Example 8

This example includes the elements according to any one of examples 1, 2 or 4, wherein the power management logic is to adjust the operating frequency in response to receiving an indication of an operating system (OS) trigger related to user input device activity.

Example 9

This example includes the elements according to any one of examples 1, 2 or 4, wherein the power management logic is to adjust the operating frequency for each frame of a plurality of frames.

Example 10

This example includes the elements according to any one of examples 1, 2 or 4, wherein the operating frequency is related to a power consumption of the encoder logic.

Example 11

This example includes the elements according to any one of examples 1, 2 or 4, wherein the power management logic is further to adjust an operating voltage of the encoder logic, the operating voltage related to the operating frequency.

Example 12

This example includes the elements according to any one of examples 1, 2 or 4, wherein adjusting the operating frequency includes adjusting an operating voltage of the encoder logic.

Example 13

According to this example, there is provided a method. The method includes method including coupling, by wireless network circuitry, encoder logic of a graphics processor to a wireless display. The method further includes adjusting, by power management logic, an operating frequency of the encoder logic based, at least in part, on an encode time duration and based, at least in part, on a frame period, the graphics processor further including display engine logic.

Example 14

This example includes the elements of example 13, further including adjusting, by the power management logic, the operating frequency based, at least in part, on at least one power management control parameter.

Example 15

This example includes the elements of example 14, wherein the power management control parameter is selected from the group including one or more of a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

Example 16

This example includes the elements of example 13, further including adjusting, by the power management logic, at least one of the operating frequency and/or an encoder delay time to reduce and/or eliminate encoder stall.

Example 17

This example includes the elements of example 16, further including adjusting, by the power management logic, the encoder delay time based, at least in part, on a location of a change within a frame.

Example 18

This example includes the elements of example 13, further including skipping, by the power management logic, encoding operations for one or more frames if a source frame rate is less than one half a vertical scan frequency of a synchronizing signal.

Example 19

This example includes the elements of example 13, further including adjusting, by the power management logic, the operating frequency based, at least in part, on a percent change between a prior frame and a new frame, the percent change received from the display logic.

Example 20

This example includes the elements of example 13, further including adjusting, by the power management logic, the operating frequency in response to receiving an indication of an operating system (OS) trigger related user input device activity.

Example 21

This example includes the elements of example 13, further including adjusting, by the power management logic, the operating frequency for each frame of a plurality of frames.

Example 22

This example includes the elements of example 13, wherein the operating frequency is related to a power consumption of the encoder logic.

Example 23

This example includes the elements of example 13, further including adjusting, by the power management logic, an operating voltage of the encoder logic, the operating voltage related to the operating frequency.

Example 24

This example includes the elements of example 13, wherein adjusting the operating frequency includes adjusting an operating voltage of the encoder logic.

Example 25

According to this example, there is provided a computer readable storage device. The computer readable storage device has stored thereon instructions that when executed by one or more processors result in the following operations including coupling encoder logic of a graphics processor to a wireless display; and adjusting an operating frequency of the encoder logic based, at least in part, on an encode time duration and based, at least in part, on a frame period, the graphics processor further including display engine logic.

Example 26

This example includes the elements of example 25, wherein the instructions that when executed by one or more processors results in the following additional operations including adjusting the operating frequency based, at least in part, on at least one power management control parameter.

Example 27

This example includes the elements of example 26, wherein the power management control parameter is selected from the group including one or more of a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

Example 28

This example includes the elements of example 25, wherein the instructions that when executed by one or more processors results in the following additional operations including adjusting at least one of the operating frequency and/or an encoder delay time to reduce and/or eliminate encoder stall.

Example 29

This example includes the elements of example 28, wherein the instructions that when executed by one or more processors results in the following additional operations including adjusting the encoder delay time based, at least in part, on a location of a change within a frame.

Example 30

This example includes the elements according to any one of examples 25, 26 or 28, wherein the instructions that when executed by one or more processors results in the following additional operations including skipping encoding operations for one or more frames if a source frame rate is less than one half a vertical scan frequency of a synchronizing signal.

Example 31

This example includes the elements according to any one of examples 25, 26 or 28, wherein the instructions that when executed by one or more processors results in the following additional operations including adjusting the operating frequency based, at least in part, on a percent change between a prior frame and a new frame, the percent change received from the display logic.

Example 32

This example includes the elements according to any one of examples 25, 26 or 28, wherein the instructions that when executed by one or more processors results in the following additional operations including adjusting the operating frequency in response to receiving an indication of an operating system (OS) trigger related user input device activity.

Example 33

This example includes the elements according to any one of examples 25, 26 or 28, wherein the instructions that when executed by one or more processors results in the following additional operations including adjusting the operating frequency for each frame of a plurality of frames.

Example 34

This example includes the elements according to any one of examples 25, 26 or 28, wherein the operating frequency is related to a power consumption of the encoder logic.

Example 35

This example includes the elements according to any one of examples 25, 26 or 28, wherein the instructions that when executed by one or more processors results in the following additional operations including adjusting an operating voltage of the encoder logic, the operating voltage related to the operating frequency.

Example 36

This example includes the elements according to any one of examples 25, 26 or 28, wherein adjusting the operating frequency includes adjusting an operating voltage of the encoder logic.

Example 37

According to this example, there is provided a device. The device includes means for coupling, by wireless network circuitry, encoder logic of a graphics processor to a wireless display. The device further includes means for adjusting, by power management logic, an operating frequency of the encoder logic based, at least in part, on an encode time duration and based, at least in part, on a frame period, the graphics processor further including display engine logic.

Example 38

This example includes the elements of example 37, further including means for adjusting, by the power management logic, the operating frequency based, at least in part, on at least one power management control parameter.

Example 39

This example includes the elements of example 38, wherein the power management control parameter is selected from the group including one or more of a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

Example 40

This example includes the elements of example 37, further including means for adjusting, by the power management logic, at least one of the operating frequency and/or an encoder delay time to reduce and/or eliminate encoder stall.

Example 41

This example includes the elements of example 40, further including means for adjusting, by the power management logic, the encoder delay time based, at least in part, on a location of a change within a frame.

Example 42

This example includes the elements according to any one of examples 37, 38 or 40, further including means for skipping, by the power management logic, encoding operations for one or more frames if a source frame rate is less than one half a vertical scan frequency of a synchronizing signal.

Example 43

This example includes the elements according to any one of examples 37, 38 or 40, further including means for adjusting, by the power management logic, the operating frequency based, at least in part, on a percent change between a prior frame and a new frame, the percent change received from the display logic.

Example 44

This example includes the elements according to any one of examples 37, 38 or 40, further including means for adjusting, by the power management logic, the operating frequency in response to receiving an indication of an operating system (OS) trigger related user input device activity.

Example 45

This example includes the elements according to any one of examples 37, 38 or 40, further including means for adjusting, by the power management logic, the operating frequency for each frame of a plurality of frames.

Example 46

This example includes the elements according to any one of examples 37, 38 or 40, wherein the operating frequency is related to a power consumption of the encoder logic.

Example 47

This example includes the elements according to any one of examples 37, 38 or 40, further including means for adjusting, by the power management logic, an operating voltage of the encoder logic, the operating voltage related to the operating frequency.

Example 48

This example includes the elements according to any one of examples 37, 38 or 40, wherein adjusting the operating frequency includes adjusting an operating voltage of the encoder logic.

Example 49

According to this example, there is provided a system. The system includes a processor; a memory; an input device; a graphics processor, power management logic and wireless network circuitry. The graphics processor includes display engine logic and encoder logic. The power management logic is to adjust an operating frequency of the encoder logic based, at least in part, on an encode time duration and based, at least in part, on a frame period. The wireless network circuitry is to couple the encoder logic to a wireless display.

Example 50

This example includes the elements of example 49, wherein the power management logic is to adjust the operating frequency based, at least in part, on at least one power management control parameter.

Example 51

This example includes the elements of example 50, wherein the power management control parameter is selected from the group including one or more of a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

Example 52

This example includes the elements of example 49, wherein the power management logic is further to adjust at least one of the operating frequency and/or an encoder delay time to reduce and/or eliminate encoder stall.

Example 53

This example includes the elements of example 52, wherein the power management logic is to adjust the encoder delay time based, at least in part, on a location of a change within a frame.

Example 54

This example includes the elements according to any one of examples 49, 50 or 52, wherein the power management logic is to skip encoding operations for one or more frames if a source frame rate is less than one half a vertical scan frequency of a synchronizing signal.

Example 55

This example includes the elements according to any one of examples 49, 50 or 52, wherein the power management logic is to adjust the operating frequency based, at least in part, on a percent change between a prior frame and a new frame, the percent change received from the display engine logic.

Example 56

This example includes the elements according to any one of examples 49, 50 or 52, wherein the power management logic is to adjust the operating frequency in response to receiving an indication of an operating system (OS) trigger related to user input device activity.

Example 57

This example includes the elements according to any one of examples 49, 50 or 52, wherein the power management logic is to adjust the operating frequency for each frame of a plurality of frames.

Example 58

This example includes the elements according to any one of examples 49, 50 or 52, wherein the operating frequency is related to a power consumption of the encoder logic.

Example 59

This example includes the elements according to any one of examples 49, 50 or 52, wherein the power management logic is further to adjust an operating voltage of the encoder logic, the operating voltage related to the operating frequency.

Example 60

This example includes the elements according to any one of examples 49, 50 or 52, wherein adjusting the operating frequency includes adjusting an operating voltage of the encoder logic.

Example 61

According to this example, there is provided a system. The system includes at least one device arranged to perform the method of any one of examples 13 to 24.

Example 62

According to this example, there is provided a device. The device includes means to perform the method of any one of examples 13 to 24.

Example 63

According to this example, there is provided a computer readable storage device. The device has stored thereon instructions that when executed by one or more processors result in the following operations including: the method according to any one of examples 13 to 24.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
a graphics processor comprising display engine logic and encoder logic; and
power management logic to adjust an operating frequency of the encoder logic based, at least in part, on an encode time duration and based, at least in part, on a frame period.

2. The apparatus of claim 1, wherein the power management logic is to adjust the operating frequency based, at least in part, on at least one power management control parameter.

3. The apparatus of claim 2, wherein the power management control parameter includes at least one of: a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

4. The apparatus of claim 1, wherein the power management logic is further to adjust at least one of the operating frequency and/or an encoder delay time to reduce and/or eliminate encoder stall.

5. The apparatus of claim 4, wherein the power management logic is to adjust the encoder delay time based, at least in part, on a location of a change within a frame.

6. The apparatus of claim 1, wherein the power management logic is to skip encoding operations for one or more frames if an source frame rate is less than one half a vertical scan frequency of a synchronizing signal.

7. The apparatus of claim 1, wherein the power management logic is to adjust the operating frequency based, at least in part, on a percent change between a prior frame and a new frame, the percent change received from the display engine logic.

8. The apparatus of claim 1, wherein the power management logic is to adjust the operating frequency in response to receiving an indication of an operating system (OS) trigger related to user input device activity.

9. A method comprising:
coupling, by wireless network circuitry, encoder logic of a graphics processor to a wireless display; and
adjusting, by power management logic, an operating frequency of the encoder logic based, at least in part, on an encode time duration and based, at least in part, on a frame period the graphics processor further comprising display engine logic.

10. The method of claim 9, further comprising adjusting, by the power management logic, the operating frequency based, at least in part, on at least one power management control parameter.

11. The method of claim 10, wherein the power management control includes at least one of: a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

12. The method of claim 9, further comprising adjusting, by the power management logic, at least one of the operating frequency and/or an encoder delay time to reduce and/or eliminate encoder stall.

13. The method of claim 12, further comprising adjusting, by the power management logic, the encoder delay time based, at least in part, on a location of a change within a frame.

14. The method of claim 9, further comprising skipping, by the power management logic, encoding operations for one or more frames if an source frame rate is less than one half a vertical scan frequency of a synchronizing signal.

15. The method of claim 9, further comprising adjusting, by the power management logic, the operating frequency based, at least in part, on a percent change between a prior frame and a new frame, the percent change received from the display logic.

16. The method of claim 9, further comprising adjusting, by the power management logic, the operating frequency in response to receiving an indication of an operating system (OS) trigger related user input device activity.

17. A computer readable storage device having stored thereon instructions that when executed by one or more processors result in the following operations comprising:
coupling encoder logic of a graphics processor to a wireless display; and
adjusting an operating frequency of the encoder logic based, at least in part, on an encode time duration and based, at least in part, on a frame period, the graphics processor further comprising display engine logic.

18. The device of claim 17, wherein the instructions that when executed by one or more processors results in the following additional operations comprising adjusting the operating frequency based, at least in part, on at least one power management control parameter.

19. The device of claim 18, wherein the power management control parameter includes at least one of: a vertical scan frequency of a synchronizing signal control signal, an encode time duration control signal, current encoder operating frequency control signal, a percent of frame change control signal, a frame data change location control signal, a stall flag control signal, one or more OS (operating system)/Application trigger control signals, and a rasterized image data ready control signal.

20. The device of claim 17, wherein the instructions that when executed by one or more processors results in the following additional operations comprising adjusting at least one of the operating frequency and/or an encoder delay time to reduce and/or eliminate encoder stall.

21. The device of claim 20, wherein the instructions that when executed by one or more processors results in the following additional operations comprising adjusting the encoder delay time based, at least in part, on a location of a change within a frame.

22. The device of claim 17, wherein the instructions that when executed by one or more processors results in the following additional operations comprising skipping encoding operations for one or more frames if an source frame rate is less than one half a vertical scan frequency of a synchronizing signal.

23. The device of claim 17, wherein the instructions that when executed by one or more processors results in the following additional operations comprising adjusting the operating frequency based, at least in part, on a percent change between a prior frame and a new frame, the percent change received from the display logic.

24. The device of claim 17, wherein the instructions that when executed by one or more processors results in the following additional operations comprising adjusting the operating frequency in response to receiving an indication of an operating system (OS) trigger related user input device activity.

* * * * *